United States Patent
Stamp et al.

(10) Patent No.: US 9,662,854 B2
(45) Date of Patent: May 30, 2017

(54) SANDWICH COMPOSITE COMPONENT AND PRODUCTION PROCESS THEREFOR

(71) Applicant: DAIMLER AG, Stuttgart (DE)

(72) Inventors: Benno Stamp, Ostfildern (DE); Tobias Blumenstock, Stuttgart (DE); Roman Wittig, Magstadt (DE)

(73) Assignee: Daimler AG, Stuttgart (DE)

( * ) Notice: Subject to any disclaimer, the term of this patent is extended or adjusted under 35 U.S.C. 154(b) by 226 days.

(21) Appl. No.: 14/388,304

(22) PCT Filed: Dec. 21, 2012

(86) PCT No.: PCT/EP2012/005342
§ 371 (c)(1),
(2) Date: Sep. 26, 2014

(87) PCT Pub. No.: WO2013/143569
PCT Pub. Date: Oct. 3, 2013

(65) Prior Publication Data
US 2015/0050446 A1    Feb. 19, 2015

(30) Foreign Application Priority Data

Mar. 30, 2012 (DE) .................. 10 2012 006 609

(51) Int. Cl.
*B32B 3/12* (2006.01)
*B29C 70/46* (2006.01)
(Continued)

(52) U.S. Cl.
CPC .............. *B32B 3/12* (2013.01); *B29C 43/206* (2013.01); *B29C 43/52* (2013.01); *B29C 70/086* (2013.01);
(Continued)

(58) Field of Classification Search
CPC  B32B 3/12; B32B 3/04; B32B 27/065; B32B 27/10; B32B 37/1465;
(Continued)

(56) References Cited

U.S. PATENT DOCUMENTS 6,065,717 A    5/2000  Book
2003/0089064 A1*  5/2003  Faulkner ................... E04D 1/34
                                                                 52/408
(Continued)

FOREIGN PATENT DOCUMENTS

DE              2912936 A1    7/1980
DE       102006058257 A1    6/2008
(Continued)

OTHER PUBLICATIONS

International Search Report dated Apr. 16, 2013, in International Application No. PCT/EP2012/005342.

*Primary Examiner* — Stella Yi
(74) *Attorney, Agent, or Firm* — Stephan A. Pendorf; Patent Central LLC

(57) ABSTRACT

A sandwich component (10) having a honeycomb core layer (4) and at least one fiber-reinforced thermoplastic outer layer (3) and the corresponding production method. The outer layer (3) is connected to the honeycomb core layer (4) by a thermoplastic material. At least one side of the sandwich component (10 has a decorative layer (1,1'), which is arranged on the outer layer (3). The sandwich component (10) furthermore has at least one foam layer (2), which is arranged between the outer layer (3) and the decorative layer (1,1'), and which is connected to the outer layer (3) and the decorative layer (1,1').

12 Claims, 2 Drawing Sheets

(51) Int. Cl.
  B32B 27/06 (2006.01)
  B32B 27/10 (2006.01)
  B29C 70/08 (2006.01)
  B32B 37/14 (2006.01)
  B29C 43/20 (2006.01)
  B29C 43/52 (2006.01)
  B32B 3/04 (2006.01)
  B32B 37/04 (2006.01)
  B29L 31/60 (2006.01)
  B29L 31/30 (2006.01)
  B29K 1/00 (2006.01)
  B29K 23/00 (2006.01)
  B29K 101/12 (2006.01)
  B29K 105/04 (2006.01)
  B29K 105/06 (2006.01)
  B29K 105/00 (2006.01)
  B29K 309/08 (2006.01)

(52) U.S. Cl.
  CPC .......... *B29C 70/088* (2013.01); *B29C 70/465* (2013.01); *B32B 3/04* (2013.01); *B32B 27/065* (2013.01); *B32B 27/10* (2013.01); *B32B 37/146* (2013.01); *B29K 2001/00* (2013.01); *B29K 2023/12* (2013.01); *B29K 2101/12* (2013.01); *B29K 2105/045* (2013.01); *B29K 2105/06* (2013.01); *B29K 2105/253* (2013.01); *B29K 2309/08* (2013.01); *B29L 2031/30* (2013.01); *B29L 2031/608* (2013.01); *B32B 37/04* (2013.01); *B32B 2250/05* (2013.01); *B32B 2250/24* (2013.01); *B32B 2305/022* (2013.01); *Y10T 428/236* (2015.01)

(58) Field of Classification Search
  CPC ... B32B 37/146; B29C 43/203; B29C 43/206; B29C 43/52; B29C 70/086; B29C 70/088; B29C 70/465
  See application file for complete search history.

(56) References Cited

U.S. PATENT DOCUMENTS

2005/0025929 A1\* 2/2005 Smith ................. B32B 3/12
    428/73
2011/0262703 A1  10/2011 Legler et al.
2012/0315429 A1  12/2012 Stamp et al.

FOREIGN PATENT DOCUMENTS

| DE | 102008035918 A1 | 2/2010 |
| DE | 102010005456 A1 | 7/2011 |
| EP | 0787578 A2 | 8/1997 |
| GB | 2041292 A | 9/1980 |

\* cited by examiner

SANDWICH COMPOSITE COMPONENT AND PRODUCTION PROCESS THEREFOR

BACKGROUND OF THE INVENTION

Field of the Invention

The invention relates to a sandwich component having a honeycomb core and outer layers, as well as a production method for the same.

Description of the Related Art

In the course of the lightweight construction strategy in the construction of motor vehicles to reduce both the fuel consumption and carbon dioxide emissions, components having a sandwich structure are increasingly used, which can provide a clearly reduced weight compared to conventional components due to the low density of the material which forms the core, and sufficient strength values due to a suitable selection of outer layer material. Further advantages of such sandwich structures lie in their thermal and acoustic properties.

A sandwich component made from cost-efficient materials having improved mechanical properties and/or improved surface quality is known from DE 10 2010 005 456 A1. The sandwich component described there comprises a honeycomb core made from a cellulose-based material such as paper and at least one fibre-reinforced thermoplastic outer layer. Therein the webs of the honeycomb core are subsumed into the thermoplastic plastic matrix of the outer layer at their connection points to the outer layer, whereby the bond of the sandwich component is produced. The production of such a sandwich component occurs by positioning the sandwich layers arranged on top of one another in a pressing tool, in which the arrangement is heated, whereby the thermoplastic matrix is at least partially fused under the pressure prevailing in the pressing tool, such that the webs of the honeycomb core are subsumed into the outer layer.

Likewise, a multi-layer component is known from EP 0 787 578 A2, which consists of a support body formed by a honeycomb arrangement, which is connected to at least one fibre-reinforced thermoplastic outer layer. For the production of the multi-layer component, the outer layer is applied to the support body, said outer layer being connected to the support body to form the multi-layer component under the influence of pressure and/or temperature, if necessary by spatial deformation. Therein, on the outer layer, a film and/or a fleece made from a thermoplastic plastic is applied to a fibrous carrier body associated with the outer layer, whereon the outer layer having the thermoplastic plastic is heated at least until this is viscous. Then the outer layer is applied to the support body and is pressed onto this for the connection of the outer layer to the support body. The outer layer is subsequently directly cooled, such that, after sufficient solidification, the component can be removed from the mould.

In both cases, the outer layer can close outwardly with an outer layer or decorative layer, which forms the visible surface of the component.

In the use of honeycomb cores having thermoplastic outer layers, it can, however, as a consequence of the flowability of the thermoplastic required between the layers for the production of the bond, lead to surface defects, in particular in the deformation zones, such as for example the imprinting of the honeycomb structure.

Based on this prior art, it is the object of the present invention to create a laminated sandwich component, avoiding the surface defects resulting from the support core that is used.

BRIEF SUMMARY OF THE INVENTION

A sandwich component according to the invention, which has a honeycomb core layer and at least one fibre-reinforced thermoplastic outer layer on both sides, which is connected to the honeycomb core layer by means of a thermoplastic material, which can be the thermoplastics of the outer layer or an additionally introduced thermoplastic material, has a decorative layer arranged on the outer layer on at least one side. In order to prevent the imprinting of the defect points, which result in the production process, of the honeycomb core on the surface through the decorative layer, the sandwich component comprises a foam layer at least on the visible side of the sandwich component between the top layer and the decorative layer, said foam layer being connected to the outer layer and the decorative layer. The foam layer is therein particularly preferably connected directly and firmly to the outer layer and the decorative layer. Depending on requirements, the sandwich component can be provided with a decorative layer and the foam layer lying thereunder only on one side, particularly on the visible side or A-side of the component; it can, however, also be equipped with decorative layers on both sides, one (the visible side) or both of which are separated from the outer layer by a foam layer.

The foam layer can consist of a foamed thermoplastic plastic, for example in order to promote the connection to the fibre-reinforced thermoplastic outer layer. Cost-efficient polyolefins, such as polypropylene and polyethylene, are suggested for use. The use of thermoplastic plastics has the advantage that a fusing and melting of the foam with the outer layer can occur. This is, in particular, of significance in the region of the edges. Preferably, a melting of the outer layers and foam layer or the thermoplastic proportions thereof is carried out in the edge regions of the sandwich component, such that a sealing of the edges is achieved. This is, for example, achieved by an increased pressing force in the hot press in the edge region. For the use in the visible region, it is herein advantageous to press the edge connection directly at the component contour. Hereby, on the one hand, a component trimming is generated, and on the other hand an almost blunt joining of the outer layers is enabled, whereby a qualitatively high-value component trimming is enabled. Hereby, a high-value trimming is enabled. Therein, a sandwich component is formed, in which the edges are sealed or are closed outwardly by melting the outer layer and foam layer. As the outer layer and the foam layer consist of thermoplastic polymers, a polymer mixture is at least partially formed by the melting.

In a preferred embodiment, the outer layer is formed from polypropylene (PP) having a fibre-reinforcement made from glass fibre fleece and the foam layer is made from foamed polypropylene or polyethylene terephthalate (PET).

Preferably, a polyester is selected as a decorative layer. Here, the polyester of the decorative layer has no recognisable melting at least on the surface or visible surface. In the edge region and in the deformation zones, the foam layer reduces or laminates the imprinting on the decorative surface. The decorative surface hereby also retains the same optical appearance in the edge region and in the deformation zones as on the remaining surface.

The sealing of the edges is particularly advantageous as moisture entering the paper honeycomb core is hereby prevented and a higher mechanical load is implemented during edge impact.

Herein it is shown that laminating the surface irregularities depends on the bulk density or the density and the thickness of the foam. The bulk density of the foam is preferably greater than 45 kg/m³. The preferred thickness is over 1 mm, preferably in the range of 1 to 5 mm. In the case of larger defects or irregularities, the bulk density as well as the foam thickness is to be adapted upwards. For the described component production in the press method, foams with high resetting behaviour, so with a low compression set, are to be selected.

The foam layer can be connected to the outer layer by means of a thermoplastic material, which is already present in the outer layer or the foam layer or both. The bond of the foam layer with the decorative layer can occur by means of the thermoplastic material of the foam layer or due to an additional adhesive layer. If necessary, the foam layer can also be connected to the outer layer by means of an adhesive layer.

In order to improve the bond between the honeycomb core layer and the fibre-reinforced thermoplastic outer layer, the sandwich component can have an additional thermoplastic intermediate layer between the honeycomb core layer and the outer layer. It can be favourable if the physical-chemical properties such as the melting or glass transition temperature of the thermoplastics of the outer layer are similar or correspond to one another.

Furthermore, the honeycomb core layer can consist cost-efficiently of a cellulose-based material, preferably of paper or cardboard.

The production of a sandwich component according to the invention comprises, after a sandwich arrangement has been formed, which comprises at least the honeycomb core layer and a thermoplastic fibre material layer for the formation of the outer layer on both sides of the honeycomb core layer, the (a) heating of the sandwich arrangement until the thermoplastic material of the fibre material layer at least begins to flow, wherein a sandwich semi-finished product is obtained. Then (b) a decorative layer is arranged on at least one side of the heated sandwich semi-finished product and a foam layer is arranged at least between one of the decorative layers that are provided for the formation of an A-side of the sandwich component, and the sandwich semi-finished product. The heated sandwich semi-finished product is (c) transferred into an, if necessary, preheated compression mould, the temperature of which lies clearly below the melting temperature of the thermoplastic matrix, and is inserted into the mould cavity in such a way that the side of the sandwich semi-finished product having the foam layer and the decorative layer forms the A-side/visible side of the sandwich component. The foam and decorative layer is applied therein firstly to the still hot sandwich semi-finished product in the cold tool cavity. This is followed by (d) the compression moulding of the heated sandwich semi-finished product with the foam and decorative layers to form the sandwich component with simultaneous cooling and thus consolidation of the thermoplastic material and production of the bond. The completed, cut-out sandwich component can then (e) be de-moulded.

The production method enables the cost-efficient in-situ lamination of the sandwich component by the use of a foam layer in order to prevent the imprinting of surface defects on the decorative layer.

The heating preferably occurs in a heating tool such as, in particular, a hot press, such that the pressing force generated therein causes an adhering of the thermoplastic fibre material layers to the honeycomb core.

Preferably, the sandwich arrangement is heated to a temperature which lies in a range above the melting temperature of the thermoplastic matrix plastic of the outer layer, such that this melts under the pressure in the hot press at least at the positions at which the fibre material layers lie on the webs of the honeycomb. If necessary, the entire matrix plastic can also be transferred into a flowable state or melted state. Usually, the heating temperature of the hot pressing tool is at least the melting temperature.

Due to the at least partial melting of the thermoplastic plastic matrix, a good bond is achieved between honeycomb core and outer layer in that the end edges of the honeycomb webs are received by the thermoplastic matrix material of the outer layer.

Depending on the type of the bond between the foam layer and the outer layer or the foam layer and the decorative layer, the method can comprise in (b) the arrangement of an adhesive layer between the foam layer and the decorative layer. The foam layer can, however, also be laminated in advance onto the decorative layer, such that, here, a foam decorative laminate is present for arrangement on the heated sandwich semi-finished product. If necessary, an adhesive layer can also be provided between the foam layer and the outer layer; however, the bond between the foam layer and the outer layer can preferably be provided by the matrix thermoplastics of the outer layer of the heated sandwich semi-finished product. Furthermore, it can be provided that the foam layer is heated before (b) until the softening of the thermoplastic material of the foam layer, such that the thermoplastic material of the foam layer becomes adhesive and can form the bond with the decorative layer and the outer layer.

If a thermoplastic intermediate layer is provided in the sandwich construction, then before step a), the arrangement of the thermoplastic intermediate layer, which can preferably be a thermoplastic film, occurs between the honeycomb core layer and the thermoplastic fibre material layer forming the outer layer.

A good bond between honeycomb core and outer layer is also hereby achieved by the at least partial melting of the thermoplastic plastic matrix, wherein, here, the end edges of the honeycomb webs are now received by the thermoplastic matrix material of the intermediate layer, which provides the connection between honeycomb core and outer layer and at the same time prevents the penetration of fibre material into the honeycomb hollow spaces and thus the reduction of the fibre proportion in the outer layer.

If a honeycomb core layer made from a cellulose-based material, for example paper, is used, it can furthermore be provided that, in particular if higher grades of deformity are present during moulding of the sandwich component, the honeycomb core layer is pre-formed in accordance with the component mould under the influence of pressure and temperature before (a), after which it was moistened in order to improve the deformability of the cellulose-based material.

The moistening can preferably occur with water by spraying or vaporising, while the pre-moulding can take place in a pressing tool under the exertion of pressure and the influence of heat (in a range of 40° C. to 200° C.). After formation of the sandwich arrangement of the pre-moulded honeycomb core with the fibre material layers (and if necessary thermoplastic intermediate layers), the method steps according to the invention then follow.

These and other advantages are depicted by the following description with reference to the accompanying figures.

BRIEF DESCRIPTION OF THE DRAWINGS

The reference to the figures in the description serves to support the description and to facilitate understanding of the subject matter. The figures are only a schematic depiction of one embodiment of the invention.

Here are shown.

DETAILED DESCRIPTION OF THE INVENTION

A sandwich component according to the invention comprises at least one decorative layer on the visible side of the component as well as the honeycomb core and the fibre-reinforced thermoplastic outer layers, wherein, by the use of a foam layer as an intermediate layer between the decorative layer (which can be, for example, textile goods) and the sandwich outer layer, this can serve for the lamination of surface defects.

Figure 1:
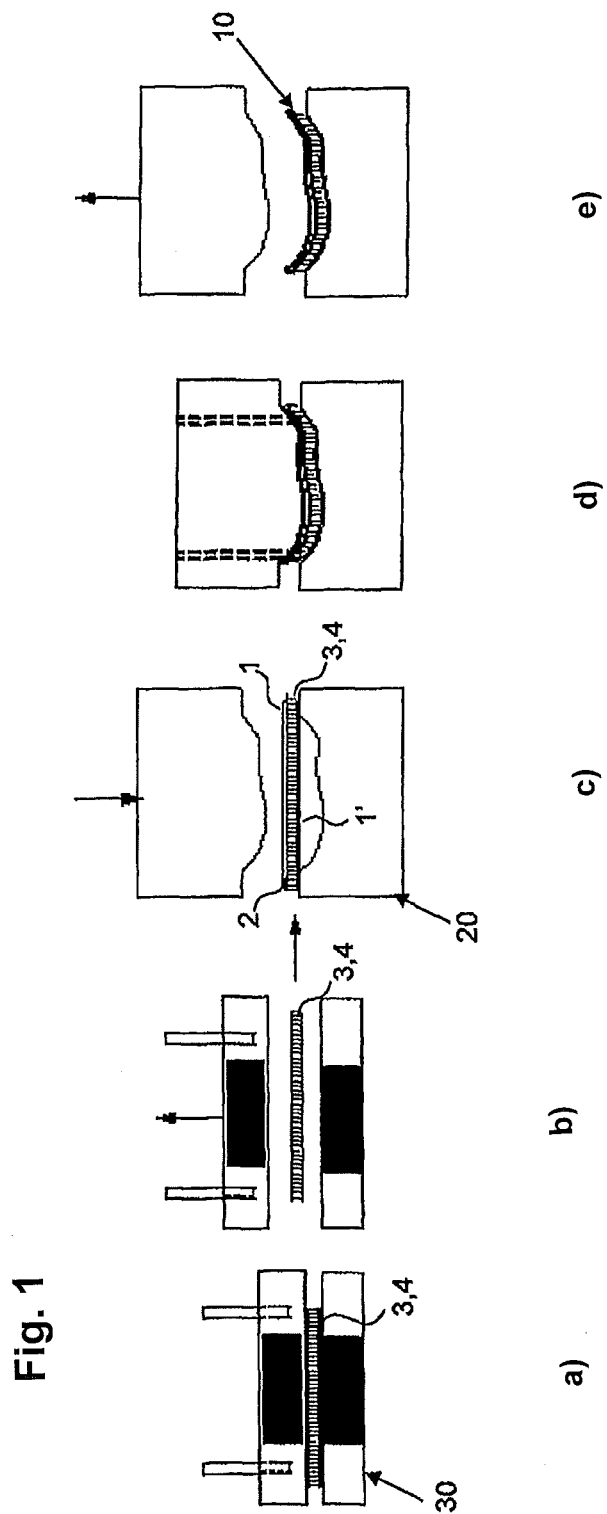
FIG. 1 a step sequence a) to e) of the method depicted in schematic sectional views of the tools, FIG. 2 an illustration of a sectional view of a sandwich component according to the invention.

An in-situ lamination in the moulding pressing tool 20 has been proved as a cost-efficient production process. The production of the sandwich component 10 is depicted schematically in FIG. 1.

In step a), a multi-layer arrangement made from fibre-reinforced thermoplastics 3 for the formation of the outer layers and the honeycomb core layer 4 arranged therebetween is heated in a heating tool 30, e.g. a hot press. Organic sheets or hybrid textiles made from reinforcement and matrix fibres are, for example, considered as fibre-reinforced thermoplastic layers 3; cellulose-based honeycomb cores 4 can preferably be used as honeycomb core layers for cost and weight reasons. The term "honeycomb" does not refer to the structure of the honeycomb core in a limiting manner, but rather means a structure formed from webs with low density and high rigidity. Suitable honeycomb core structures comprise the typical hexagonal "honeycomb structures", just like wave-shaped, circular, rhombic or rectangular fold structures, as well as irregularly designed "organic"-appearing structures. Among other things, paper and cardboard are considered as cellulose-based material for the honeycomb core.

The reinforcing fibres of the fibre-reinforced thermoplastic layers 3 for the formation of the outer layer can be present in the form of fleece, random non-woven material or fibre mat with directed fibres, fabrics, knitted fabrics, cores, aligned both in one direction and in many. The reinforcement fibres can be pre-consolidated in a planar manner in a thermoplastic matrix; this semi-finished product type is also known as organic sheets. Furthermore, the use of a hybrid thread or hybrid textile is also conceivable, such that a fibrous semi-finished product is used, which contains thermoplastic fibres that form the matrix, as well as reinforcing fibres. Here, the reinforcing fibres are natural fibres, glass fibres, carbon fibres, polymer fibres, in particular aramid fibres—however, combinations of different fibres can also be used.

The multi-layer arrangement can furthermore comprise a thermoplastic film as an intermediate layer between the fibre-reinforced thermoplastic layers 3 and the honeycomb core 4 for the improvement of the outer layer connection. Particularly suitable herein are films made from thermoplastics, the melting properties of which correspond to those of the thermoplastic matrix material of the outer layer, such that the intermediate layer connects to the outer layer and creates the connection to the honeycomb core layer at the same time. The film thermoplastic and the thermoplastic matrix of the outer layer can be the same thermoplastic material.

Thermoplastics are considered such as for example polyamides, acrylonitrile butadiene styrene, polypropylene or other polyolefins.

An application of temperature takes place in the heating tool 30, which is dependent on the type of the thermoplastic(s) used and in which these are at least softened, preferably melted, such that the fibre layers 3 forming the outer layer adhere to the honeycomb core 4 by means of the matrix thermoplastics or the thermoplastics of the intermediate layer.

The thus generated and still heated sandwich semi-finished product made from honeycomb core 4 and outer layers 3 (and, if necessary, the thermoplastic films lying therebetween) can be removed after opening the heating tool 30 in step b) and transferred into the moulding pressing tool 20, wherein the arrangement of the decorative layers 1, lion the corresponding sides of the heated sandwich semi-finished product 3, 4 occurs with respect to the component mould (step c). If necessary, it can be provided to laminate only the visible side (A-side) of the component with a decorative layer 1.

To prevent imprinting, a foam layer 2 is integrated at least between the decorative layer 1 forming the visible side of the component and the outer layer 3, in order to obtain a good surface quality on the A-side. This foam layer 2 can already be laminated with the decorative layer 1. The foam layer 2 can, however, also be supplied separately. Thus, during the transfer of the heated sandwich semi-finished product 3, 4, the arrangement of the foam layer(s) firstly occurs before the decorative layer(s) is/are applied.

The foam layer 2 adheres to the outer layer 3 due to the matrix plastic which is flowable due to the heating. For the connection to the decorative layer 1, the foam layer 2, which can consist of a foamed thermoplastic, can likewise be heated. This can, if necessary, occur together with the sandwich semi-finished product 3, 4 or separately, in order to enable not only the material connection to the thermoplastic matrix of the outer layer 3 but also to the decorative layer 1. However, in this case, the foam layer should only soften and become adhesive, but not melt, in order not to lose the foam structure. Alternatively, the foam layer 2 can be connected in particular to the decorative layer 1, but also if necessary to the outer layer 3, by an additional adhesive layer. In this case, other materials can also be used as thermoplastics for the foam layer.

For a foam layer 2 made from a thermoplastic, a thermoplastic can be selected according to the thermoplastic intermediate film, the melting properties of which correspond to those of the thermoplastic matrix material of the outer layer, such that the foam layer can be connected to the outer layer during heating. Thus the foam layer can also be produced from a thermoplastic such as polyamides, acrylonitrile butadiene styrene, polypropylene, polyethylene or other polyolefins. The thermoplastic for the formation of the foam layer can also be selected with regard to its melting properties such that it has a higher melting or glass transition temperature in comparison to the thermoplastic of the outer layer, in order to prevent the foam layer in contact with the heated sandwich semi-finished product from losing its foam structure.

The pressing tool 20 has a temperature clearly below the melting temperature of the thermoplastic outer layer, such that during closing of the tool 20, not only the moulding into the component 10 takes place, but at the same time the bond production between the material layers occurs by cooling the thermoplastic material (step d). Due to the foam layer 2 it is enabled to laminate defect points resulting in particular in the regions to be deformed, which are caused by the deformation of the honeycomb core 4. Thus, for example, imprinting arising as a result of cell wall tears of the honeycomb core are laminated on the surface. After opening the pressing tool 20, the completed component 10 can be de-moulded.

With the foam layer 2 as an intermediate layer, the production of the sandwich component 10 is enabled with cost-efficient in-situ lamination.

Figure 2:
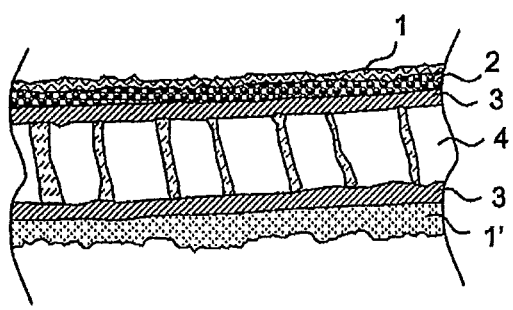

FIG. 2 shows the sandwich construction in a photographic illustration of a section through a sandwich material constructed according to the invention. The visible side of the component (A-side) is formed here by a textile decorative product 1, under which the laminating foam layer 2 is present, which is separated from the paper honeycomb 4 by a thermoplastic fibre fleece of the outer layer 3, here glass fibres in polypropylene. On the paper honeycomb 4, a thermoplastic fibre fleece as an outer layer 3 and a textile decorative product 1', which forms the B-side, are arranged on the underside of the component 10. Here, no foam layer is present between the outer layer 3 and the B-side decorative layer 1'; generally it is possible, however, to provide both sides of the sandwich with a laminating foam layer under the decorative layer.

The invention claimed is:

1. A method for preventing the surface defects in a sandwich component (10) having two fibre- reinforced thermoplastic outer layers (3) and a honeycomb core layer (4) arranged therebetween, wherein the outer layers are connected to the honeycomb core layer (4) by a thermoplastic material, wherein at least one side of the sandwich component (10) has a decorative layer (1,1'), which is arranged on at least one of the outer layers (3), wherein the sandwich component (10) furthermore comprises at least one foam layer (2) made from a foamed thermoplastic material, which is arranged between at least one of the outer layers (3) and the decorative layer (1,1'), wherein the at least one foam layer (2) is connected to at least one of the outer layers (3) and the decorative layer (1,1'), and wherein edges of the sandwich component (10) are sealed, or are closed outwardly, the method comprising the steps:
   a) heating a sandwich arrangement, which comprises at least the honeycomb core layer (4) and two thermoplastic fibre material layers for the formation of the outer layers (3), until the thermoplastic material of the fibre material layers (3) at least begins to flow, thus obtaining a sandwich semi-finished product,
   b) arranging at least one decorative layer (1,1') on at least one side of the heated sandwich semi-finished product, and arranging a foam layer (2) at least between the at least one decorative layer (1, 1'), which is provided to form an A-side/visible side of the sandwich component (10), and the sandwich semi-finished product, wherein the foam layer (2) is of sufficient thickness to prevent imprinting of defect points from the honeycomb through the at least one decorative layer onto a surface of the visible side,
   c) transferring the heated sandwich semi-finished product having the at least one foam layer (2) and the at least one decorative layer (1,1') into an unheated compression mould (20), and inserting it into a moulding cavity in such a way that the side of the sandwich semi-finished product having the at least one foam layer (2) and the at least one decorative layer (1,1') will form an A-side/visible side of the sandwich component (10),
   d) compression moulding the heated sandwich semi-finished product having the at least one foam layer (2) and the at least one decorative layer (1,1') to form the sandwich component (10), thus simultaneously cooling and forming a bond between the layers of the sandwich component (10), and
   e) de-moulding the sandwich component (10).

2. The method according to claim 1, wherein the heating occurs in a heating tool (30).

3. The method according to claim 1, wherein the heating occurs in a hot press (30).

4. The method according to claim 1, further comprising the step:
   in step b), arranging an adhesive layer between the at least one foam layer (2) and at least one of the decorative layer (1) and the outer layers (3) or
   before step b), laminating the at least one foam layer (2) onto the at least one decorative layer (1) or heating the at least one foam layer (2) until a softening of the thermoplastic material of the at least one foam layer (2), such that the thermoplastic material of the at least one foam layer (2) becomes adhesive.

5. The method according to claim 1, further comprising the step:
   before step a), arranging a thermoplastic intermediate layer between the honeycomb core layer (4) and at least one of the thermoplastic fibre material layers (3).

6. The method according to claim 1, further comprising the step:
   before step a), arranging a thermoplastic film between the honeycomb core layer (4) and at least one of the thermoplastic fibre material layers (3).

7. The method according claim 1, further comprising the step:
   before step a), moistening the honeycomb core layer (4) made from a cellulose-based material and pre-moulding of the honeycomb core layer (4) under an influence of pressure and temperature in accordance with the compression mould.

8. The method according to claim 1, wherein the at least one foam layer (2), during the heating until softening of the thermoplastic material in the edge regions of the sandwich component, leads to a melting with the outer layers and to a sealing of the edges.

9. A sandwich component (10) produced by the process of claim 1, having two fibre- reinforced thermoplastic outer layers (3) and a honeycomb core layer (4) arranged therebetween, wherein the outer layers are connected to the honeycomb core layer (4) by a thermoplastic material, wherein at least one side of the sandwich component (10) has a decorative layer (1,1'), which is arranged on at least one of the outer layers (3), wherein the sandwich component (10) furthermore comprises at least one foam layer (2) made from a foamed thermoplastic material, which is arranged between at least one of the outer layers (3) and the decorative layer (1,1'), wherein the at least one foam layer (2) is connected to at least one of the outer layers (3) and the decorative layer (1,1'), and wherein edges of the sandwich component (10) are sealed, or are closed outwardly.

10. The sandwich component (10) according to claim 9, wherein the at least one foam layer (2) is connected to at least one of the outer layers (3) and to the decorative layer (1,1') by the thermoplastic material, which is present in at least one of the outer layers (3) and the foam layer (2), or in that the at least one foam layer (2) is connected to at least one of the outer layers (3) and the decorative layer (1,1') by an adhesive layer.

11. The sandwich component (10) according to claim 9, wherein the honeycomb core layer (4) consists of a cellulose-based material.

12. The sandwich component (10) according to claim 11, wherein the cellulose-based material is paper or cardboard.

* * * * *